United States Patent [19]

Beierle et al.

[11] Patent Number: 4,657,469
[45] Date of Patent: Apr. 14, 1987

[54] TRESTLE-TYPE REEL CARRIER

[76] Inventors: Carl F. Beierle, 13424 Beach Ave., Marina del Rey, Calif. 90292; Harry Irik, 2025 Ashland Ave., Santa Monica, Calif. 90405

[21] Appl. No.: 820,951

[22] Filed: Jan. 21, 1986

Related U.S. Application Data

[63] Continuation-in-part of Ser. No. 622,979, Jun. 21, 1984, abandoned.

[51] Int. Cl.$^4$ ............................................... B66F 9/06
[52] U.S. Cl. ................................ 414/607; 242/86.5 R; 403/259; 403/343; 414/608; 414/911
[58] Field of Search ............... 414/607, 608, 623, 785, 414/908, 910, 911; 294/67.1, 81.1, 81.5, 81.56; 242/86.5 R; 403/259, 261, 343

[56] References Cited

U.S. PATENT DOCUMENTS

| | | | |
|---|---|---|---|
| 1,610,753 | 12/1926 | Davis et al. | 414/911 X |
| 1,895,217 | 1/1933 | Van Vorst | 414/911 X |
| 2,193,047 | 3/1940 | Truitt et al. | 414/911 X |
| 2,616,637 | 11/1952 | Schroeml | 414/911 X |
| 2,705,114 | 3/1955 | Worsham | 414/911 X |
| 2,714,463 | 8/1955 | Fraser | 414/607 |
| 3,177,782 | 4/1965 | Sampson | 403/343 X |
| 3,415,339 | 12/1968 | Range | 414/607 X |
| 3,759,399 | 9/1973 | Glass et al. | 414/607 X |
| 3,893,579 | 7/1975 | Glewwe | 414/607 X |
| 3,916,801 | 11/1975 | Henderson | 414/911 X |
| 3,938,685 | 2/1976 | Walchek | 414/608 |
| 4,084,706 | 4/1978 | Russell | 414/607 X |
| 4,184,570 | 1/1980 | Edwards | 414/785 X |
| 4,394,097 | 7/1983 | Horlacher | 403/259 X |
| 4,447,012 | 5/1984 | Woodruff | 414/911 X |
| 4,469,289 | 9/1984 | Gebo | 414/911 X |
| 4,519,747 | 5/1985 | Yamazaki et al. | 403/259 X |
| 4,558,830 | 12/1985 | Larsson | 414/911 X |
| 4,579,504 | 4/1986 | Lemme et al. | 414/607 |

FOREIGN PATENT DOCUMENTS 2708494  8/1978  Fed. Rep. of Germany ...... 414/608

Primary Examiner—Joseph E. Valenza
Assistant Examiner—David A. Bucci
Attorney, Agent, or Firm—Cislo & Thomas

[57] ABSTRACT

A reel carrier for attachment to power equipment such as fork lift vehicles or overhead hoist cranes removably mountable upon the fork lift or holding coupling elements thereof and having a frame of generally horizontal rectangular configuration with downwardly depending arms attached thereto is disclosed. The arms are adapted on a U-shaped, hook-like lower end to receive and retain an axle designed to engage and retain the reels to be carried by the apparatus. Bracing members and a cantilever rigidifying support attached to the frame are disclosed. The arms are taught to be adjustable to accommodate the various sized and numbers of reels to be carried by the device. Alternate embodiments are disclosed for supporting the reels in an elevated position for traversal over hilly terrain.

12 Claims, 14 Drawing Figures

TRESTLE-TYPE REEL CARRIER

CROSS-REFERENCE TO RELATED APPLICATION

The present application is a continuation-in-part application Ser. No. 06/622,979, filed June 21, 1984, now abandoned.

BACKGROUND OF THE INVENTION

This invention relates to apparatus or equipment, commonly referred to as a reel carrier, particularly adapted for use with power hauling equipment, such as a fork-lift type vehicle, and intended for handling and transporting heavy objects of the type which ordinarily have a central opening. More particularly, the invention is especially adapted for the handling and transportation of coils of material such as wire or cable. Even more particularly, the invention is adapted for the handling of such coils of material over rough terrain. The invention will be described in an exemplary form herein as adapted for use with reels of cable, such articles normally being relatively heavy and unwieldy.

The specific genesis of the present invention is from the electrical construction industry where large-sized cable reels are always difficult to handle and normally pose major problems to transport and use in a cost effective manner.

Usually the cable reels are moved by power hauling equipment, such as a fork-lift truck, from a storage yard to the point where the cable is to be pulled. The cable reels are then set up on pre-positioned, stationary reel jacks for the actual pulling portion of the operation. Once the pull is completed, the cable reels are lowered from the reel jacks, reloaded onto the fork-lift or hauling equipment and transported back to the storage yard for unloading and storage (a time-consuming, costly and sometimes dangerous operation for the workers).

In general, in activities such as the above-described cable pulling involving cable being payed-out to overhead line poles, or underground tunnel conduits, or in construction wiring of new buildings, the individual cable reels must be aligned with the proposed cable path and held in a freely rotatable, but fixed position, so that the cable may be pulled or payed-out from the reel. If a number of cables are to be pulled, each cable reel must be aligned and positioned, then moved to align and position the next cable reel. As each reel may easily weigh several hundreds of pounds, power hauling equipment, such as a fork-lift truck, is normally used to move, align and position the cable reels. While the use of power hauling equipment has considerably facilitated handling cable reels, present problems in handling, transportation, storage and cost-effective use of equipment remain.

These problems include those of attaching or securing lifting and handling means to the reel or coil so that the reels may be quickly aligned, moved and held in a freely rotatable but fixed position for pulling activities.

Another problem is that power hauling equipment is expensive and therefore must be used in the most cost-effective manner possible to complete the job and insure its nearly constant availability for small but necessary tasks. Accordingly, it has been found that it is impracticable to dedicate power hauling equipment solely to align and position reels.

Because of the continuing need for cost-effective solutions to such demanding problems which can mean profit or loss and thus life or death to a small company or increased cost to the consumer-customer of a large company, it is a primary object of this invention to provide a simplified, economic, inexpensive yet extremely effective solution to the problems stated. The invention provides this solution in the form of a simplified but effective, novel and non-obvious means and technique for aligning, repositioning, lifting and transporting a single or multiple reels.

In actual application to cable pulling operations in the electrical construction industry, the present invention would load the cable reels at the storage yard and be moved by power hauling equipment to the pull site. Further, the cable reels may be easily transported over rough terrain that might otherwise impede their movement by power hauling equipment. Unlike existing prior art of which the inventors are aware, the reels are already in a configuration such that the cable, coiled on the carried reels, may be pulled directly from the reels as they are being carried by the device. When the pull is completed, the cable reels can be moved directly back to the storage yard or to another pull site with little further handling or loss of costly workers' time.

It will be seen then, that the invention eliminates much of the redundant and dangerous labor found in handling large, heavy and unwieldy cable reels, thus providing a safer and more cost-effective solution to the problems outlined above.

DESCRIPTION OF THE PRIOR ART

In general, it is well-known to mount a reel of heavy cable upon a mobile vehicle for transport to and from one location to another, as for example, to a place where the cable is to be payed-out on a job.

It is also known to mount a reel of cable upon a mobile vehicle in such a manner that the reel can be rotated about a removable axle so as to pay-out cable therefrom without removing the reel from the vehicle.

All of these arrangements, of which the inventors are aware, suffer serious disadvantages which are solved in the present invention.

Specifically, while the prior art has recognized the need for equipment particularly adapted for use with power hauling equipment intended for handling, transporting and positioning heavy objects such as cable coils and the like, none have disclosed the unique design of the herein described inventive device.

Russell U.S. Pat. No. 4,084,706 is directed to a hoisting dolly for use with lift trucks, and provides a trestle-like supporting system. However, the Russell device is not taught mounted to power equipment as is taught for the device disclosed by Applicant. An alternate embodiment of the Russell device is shown associated with a fork-lift vehicle in FIGS. 6, 7 and 8 of Russell, but the method disclosed in Russell for associating its device with power equipment such as a fork-lift vehicle is patentably distinct and exclusive from that taught herein.

Gottlieb U.S. Pat. No. 3,863,970 is directed to a fork-lift truck spreader for use with cargo containers. While Gottlieb teaches a trestle-like structure having a platform frame and a skew frame, which assembly appears to be displaceable in the transverse direction, it does not provide for the depending holding means coupling the device of the invention to the retained reels.

Fraser U.S. Pat. No. 2,714,463 is directed toward what is termed a reel truck and provides a structural framework to engage a reel to be carried by the device. The "carried" reel, however, may contact the ground on its rim during movement (for braking purposes), making it distinctive from the device of the invention and impractical for use in field situations where a danger of soft ground or rough terrain exists. Also, while the Fraser device provides for engagement of its carried reels in the same orientation as that of the device of the invention, Fraser fails to disclose or claim any of the structural frame considerations taught herein.

Stumpf German Patent DT No. 2708-494 is directed to a transporter frame for containers emptied by filting, using a fork lift truck. Such apparatus, however, does not have the rigidifying support structure provided by the present invention which enables the transport of one or more reels of cable.

Glewwe U.S. Pat. No. 3,893,579 is also directed to apparatus for emptying containers or drums. Again, the rigidifying support structure provided by the present invention is lacking.

In conclusion, while the prior art found and known by the inventors does teach dollies and handling devices for use in cable handling and the like, the prior art, of which Applicant is aware, fails to disclose, teach or claim the specific type of trestle-like handling devices disclosed, taught and claimed herein.

OBJECTS AND SUMMARY OF THE INVENTION

It is an object of the invention to provide a unique arrangement of a reel carrier devised to operate in conjunction with power hauling equipment such as a fork-lift truck, an overhead hoist or a crane.

Another object of this invention is to provide a relatively inexpensive and non-complex reel carrier which is easily and readily connectible to and disconnectible from the forks of a lift truck or the holding coupling of an overhead hoist or crane and which greatly enhances the overall efficiency of handling such objects.

Another object of this invention is to provide a reel carrier for safer handling of such large, bulky and unwieldy objects by providing means that prevents the inadvertent loss of such object when material, such as cable, wire, or metal strips carried on such cylindrical objects, is payed-out at a job site.

Still another object of this invention is to provide a simple, but sturdy, mechanism that permits several objects, such as a number of cable reels of various sized cables, to be simultaneously carried for use at a job site, thus providing for quicker completion of a job by eliminating the necessity of halting work while a first cable reel is removed and a second cable reel is brought in and positioned for use and providing for greater effective use of costly and limited power equipment at a job site.

Yet another object of this invention is to provide a mechanism that permits several objects, such as a number of cable reels of various sized cables, to be simultaneously carried for use at a job site over terrain that is other than level.

A still further object of the invention is to provide a flanged retainer which permits several smaller axle rods to be joined in a linear fashion for supporting a plurality of spools, which flanged retainer also includes means for preventing reels from rubbing against the supporting frame.

Briefly, the subject invention comprises a reel carrier apparatus adapted for use with power equipment such as a fork-lift truck having a pair of forwardly extending, vertically movable lift forks, which enables such truck to handle at least one relatively large, horizontally disposed cylindrical object having a central axially oriented opening therethrough, the apparatus comprising:

a frame of generally horizontal rectangular configuration having a first and a second tubular pipe-like member held in a generally parallel, spaced relation;

at least two downwardly depending arms attached to an upper end to the first tubular pipe-like member of the frame having means on an opposite lower end of the arms to retain in a selectively releasable relation an axle member in a generally parallel spaced relation to the first tubular pipe-like member of the frame;

bracing members connected at a first end to at least one of the downwardly depending arms and at an opposite second end to the frame;

rigidifying supporting means attached to the first tubular pipe-like member of the frame and extending generally vertically upward therefrom, adapted to support the first tubular pipe-like member of the frame from deforming forces; and means for mounting and supporting the frame in a generally horizontal, and selectively releasable relation to the fork lifts of the truck.

In a preferred embodiment, suitable for conversion to carrying reels over hilly terrain, the reel carrier apparatus comprises:

means for receiving the lift forks;

vertical support means extending upwardly from the means for receiving the forks lifts;

bracing members connected at a first end to the vertical support means and at an opposite second end to the means for receiving the lift forks;

a horizontal support member held in selectively releasable relation by the vertical support means; and reel support means associated with the means for receiving lift forks in a selectively releasable relation for maintaining at least one cable reel in a rotatable position.

The reels may be supported between the means for receiving the lift forks or suspended below therefrom.

In place of the horizontal support member, a frame may be provided, comprising a horizontal main support member; at least two downwardly depending arms attached at an upper end to the horizontal main support member having means at an opposite lower end of the arms to retain in a selectively releasable relation an axle member in a generally parallel spaced relation to the horizontal main support member; rigidifying supporting means attached to the horizontal main support member and extending generally vertically upward therefrom, adapted to support the horizontal main support member from deforming forces.

Finally, a flanged retainer is provided. A plurality of such flanged retainers permit linear coupling of several reel support axles. The flanged retainer comprises:

(a) a hollow shaft for receiving a portion of a threaded axle;

(b) a flange mounted on each end of the shaft, one flange defining an outer portion and the other flange defining an inner portion;

(c) a third flange mounted on the shaft intermediate the inner and outer flanges;

(d) means within the hollow shaft for threadably engaging the threaded axle, the threaded means between the outer and the middle flange, with the remainder of the hollow shaft adapted to receive a portion of the axle; and (e) means for preventing further rotation of the flanged clamp about the axle.

Other objects and advantages of the present invention will become more readily apparent upon reference to the accompanying drawings and following description.

DESCRIPTION OF THE PREFERRED EMBODIMENT

Figure 12:
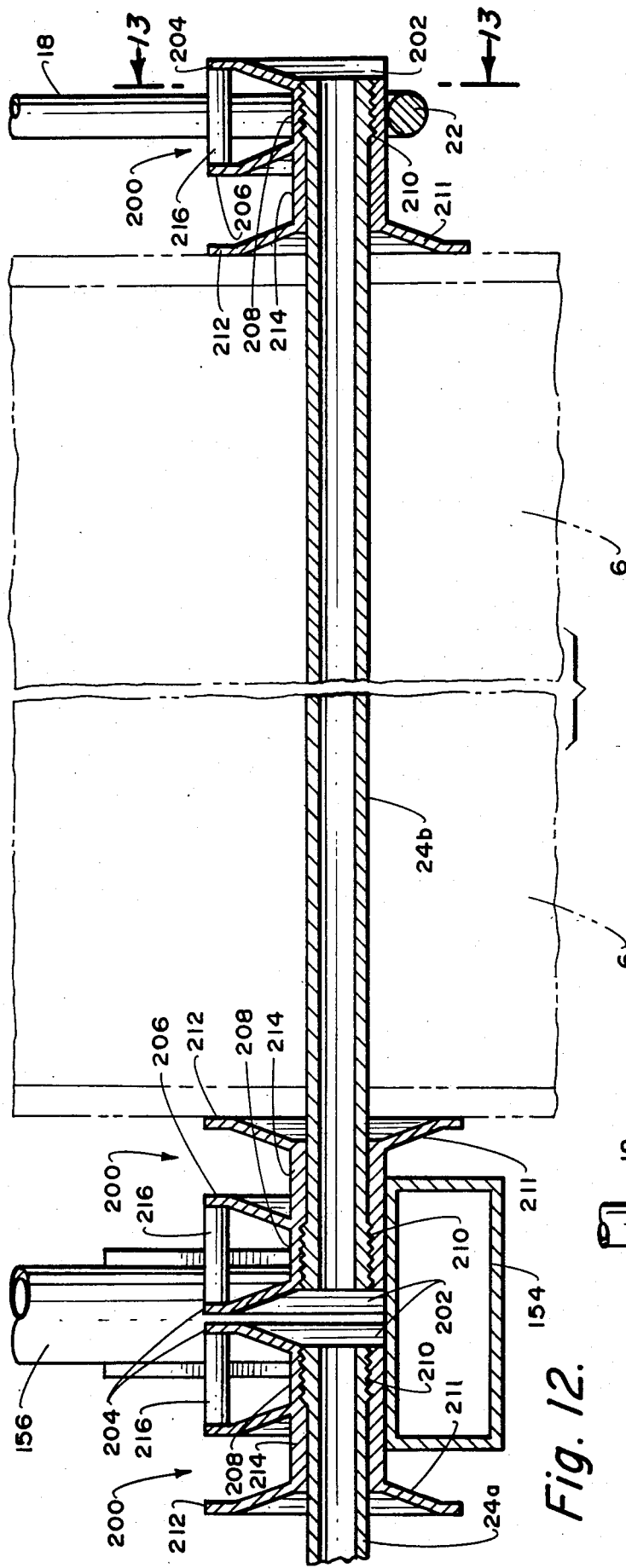
FIG. 12 is a cross-sectional view taken along the line 12—12 of FIG. 9, depicting a preferred flanged retainer arrangement.
Figure 14:
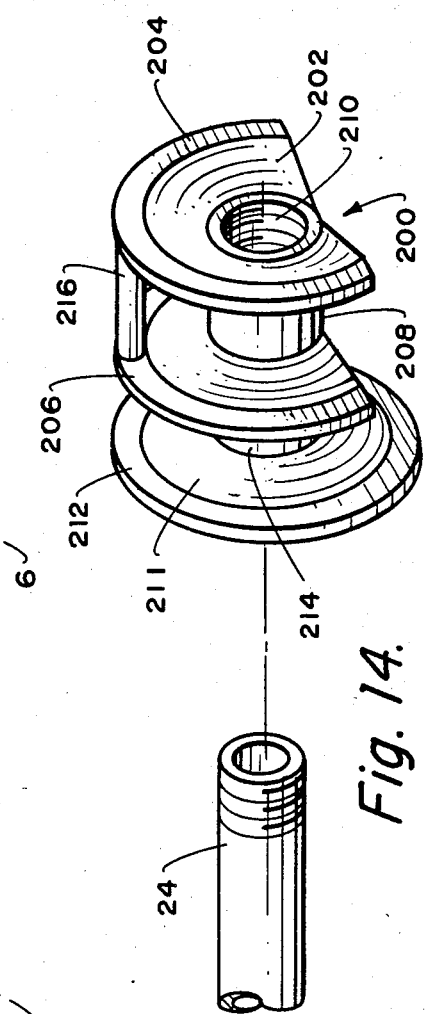
FIG. 14 is an exploded view, showing the coupling arrangement of the preferred flanged retainer and a pipe.
Figure 13:
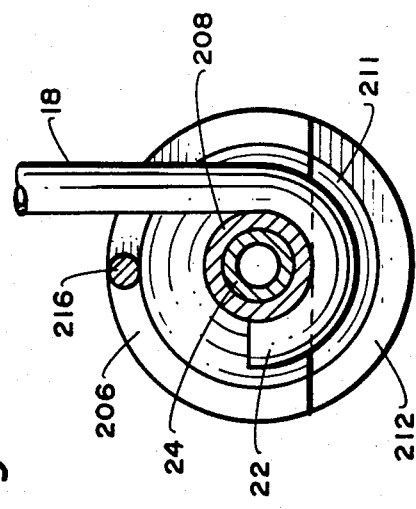
FIG. 13 is a partial cross-sectional view taken along the line 13—13 of FIG. 12.

Referring to the drawings wherein like numbers of reference designate like elements throughout, one preferred embodiment of an apparatus constructed in accordance with the invention disclosed herein is shown in FIGS. 1-6. Other preferred embodiments, depicted in FIGS. 7-11, are directed to the transport of cable reels over rough terrain. A preferred clamp is shown in FIGS. 12-14.

Figure 1:
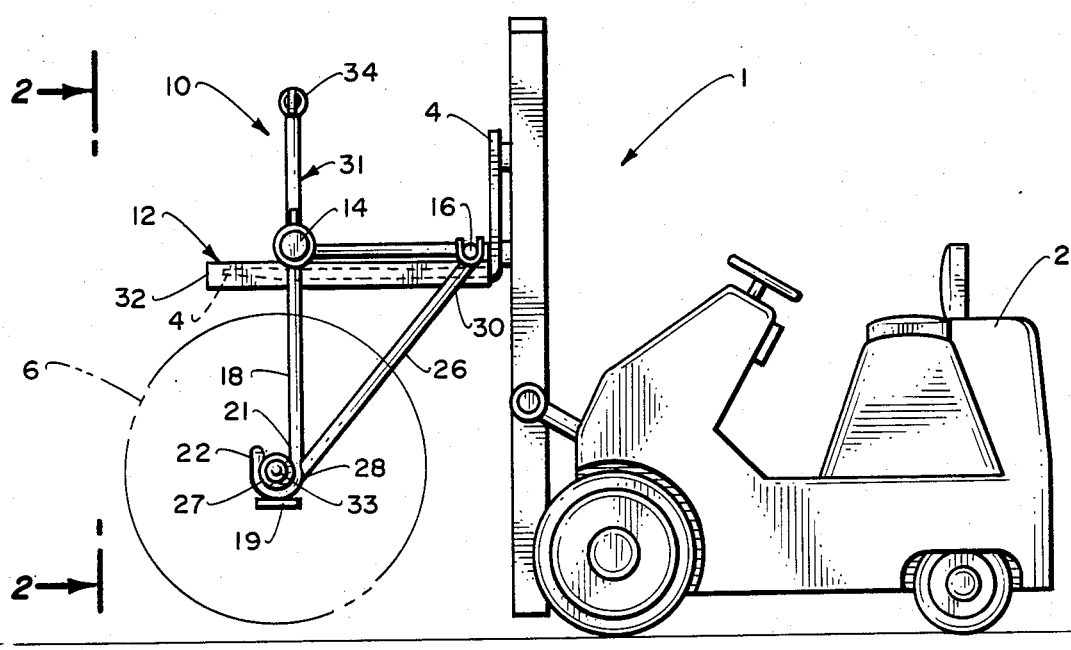
FIG. 1 is an overall left-hand side elevational view of a multiple reel carrier attachment embodying the principles of the present invention mounted on a fork-lift truck and supporting a cable reel.

The apparatus of the invention, generally referred to as 1, is shown in FIG. 1 in association with a conventional fork-lift truck 2 having a pair of forwardly extending, vertically movable lift forks 4. Also illustrated in phantom line in FIG. 1 (as well as FIGS. 2 and 4) for non-limiting descriptive purposes only, are relatively large, horizontally disposed cylindrical objects 6 having a central, axially oriented opening 8 therethrough.

Apparatus 1 itself comprises a platform frame 10 of tubular, pipe-like members 12 of generally horizontal rectangular configuration having a first tubular pipe-like member 14 and a second tubular pipe-like member 16 held in a generally parallel, spaced relation by transverse tubular pipe-like members 15.

The tubular pipe-like members forming platform frame 10 are joined at their ends to abutting tubular pipe-like members by any of the known means, such as welding, to form platfom frame 10 as a rigid structure resistive to deforming forces.

Figure 2:
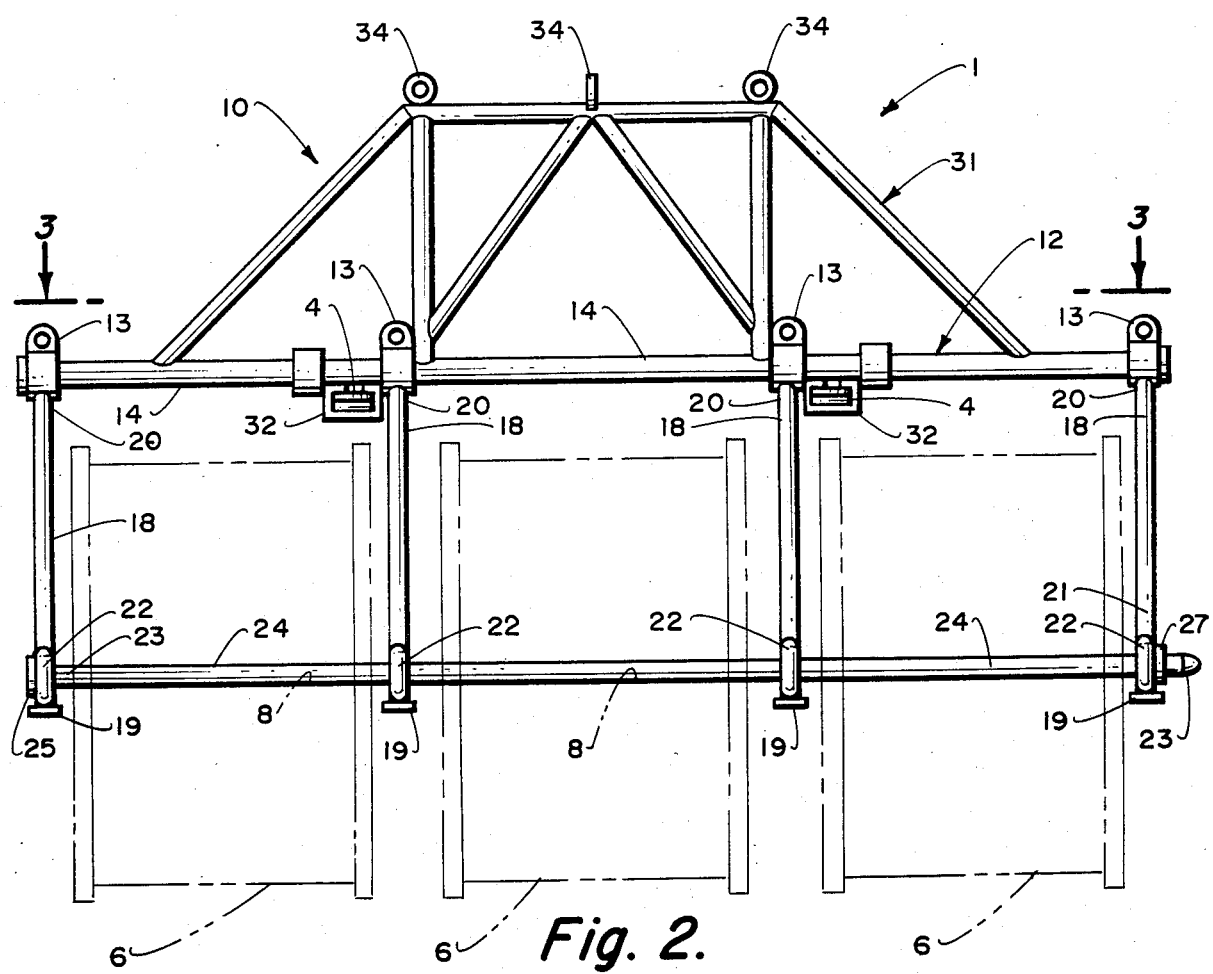
FIG. 2 is a front view taken along the line 2—2 of FIG. 1 of a multiple reel carrier attachment embodying the principles of the present invention, showing in phantom line a number of reels mounted thereon.
Figure 3:
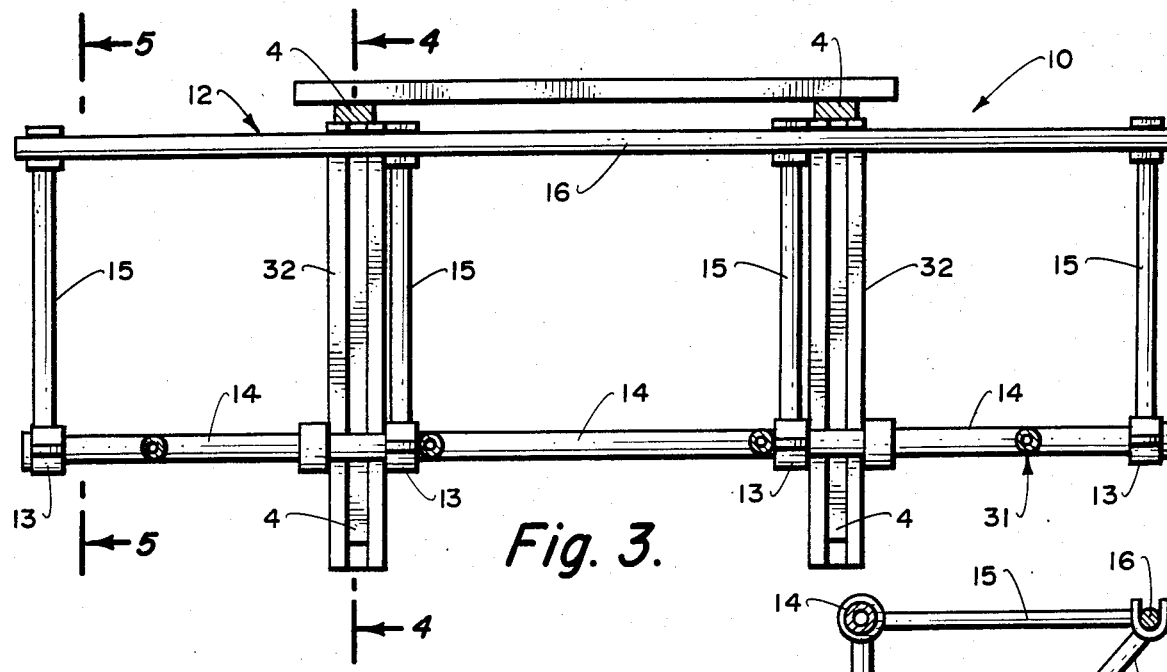
FIG. 3 is a top plan view taken along the line 3—3 of FIG. 2 of a multiple reel carrier attachment embodying the principles of the present invention.
Figure 6:
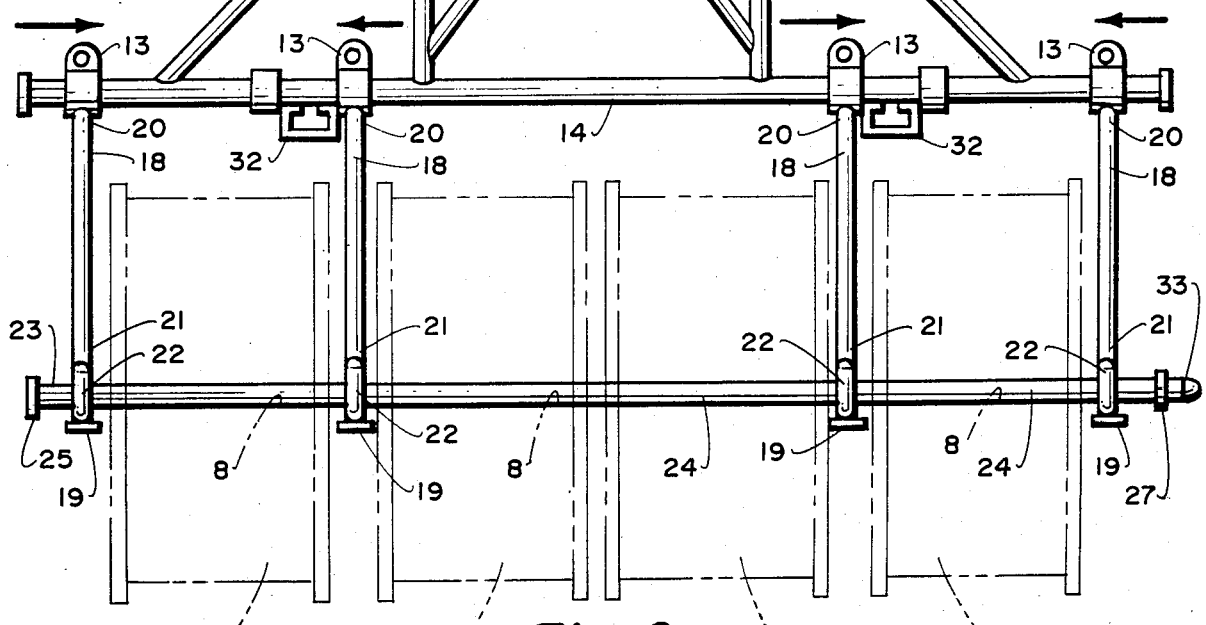
FIG. 6 is a front view of an alternate multiple reel carrier attachment embodying the principles of the present invention suspended from above and showing in phantom line a number of reels mounted thereon and how the attachment may be adjusted to accommodate various sized reels.

At least two, although three and four are illustrated in the preferred embodiment shown in the Figures, downwardly depending arms 18 are attached at an upper end 20 to the first tubular pipe-like member 14 of frame 10. Preferred means for attaching arms 18 to first tubular pipe-like member 14 is a two-piece Dutchman-type clamp 13 which enables selective positioning of arms 18 anywhere along a longitudinal axis of tubular pipe-like member 14 in order to accommodate various sizes and numbers of objects 6 as best seen in FIGS. 2 and 6.

An opposite lower end 21 of arms 18 has a U-shaped, hook-like portion 22 adapted to receive and retain therein, in a selectively releasable relation, an axle 24 in a generally parallel spaced relation to first tubular pipe-like member 14 of frame 10.

Attached, by welding, forming or the like method, to a portion of the exterior circumference of U-shaped, hook-like portion 22 of arms 18 is a buffer plate 19 adapted to retain individual objects 6 from rubbing against arms 18, which would otherwise cause difficulty in rotating objects 6 about axle 24 and frictional wear against arms 18. Buffer plates 19 work to extend the useful life of apparatus 1 by preventing unnecessary wear and tear on arms 18 and improve the ease of rotating objects 6 around axle 24 by eliminating frictional retarding forces from objects 6 directly abutting arms 18.

Axle 24 has a diameter adapted to pass through opening 8 in objects 6 and can be retained in U-shaped, hook-like portions 22 of arms 18 and has a length sufficient to extend beyond the dimensions of objects 6. On a first end 23 is an enlarged head 25 adapted to prevent end 23 from inadvertently disengaging from U-shaped hook-like portions 22 of arms 18. Opposite end 33 of axle 24 is tapered to form an axle guide to compensate for minor misalignment of opening 8 in objects 6. Adjacent end 33 is joined to flange 27 adapted to retain the axle 24 in engagement with U-shaped hook-like portions 22 of arms 18. A Dutchman-type flange is used in a preferred embodiment for flange 27.

Bracing members 26 span the space between second tubular pipe-like member 16 of frame 10 and lower end 21 of arms 18. Specifically, bracing members 26 are connected at a first end 28 to lower end 21 of arms 18 in a fixed relation by welding or the like at abutting points. An opposite second end 30 is held in a slidably movable, selective manner, along a longitudinal axis of second tubular pipe-like member 16 of frame 10. Thus, bracing members 26 provide support for arms 18 and axle 24 (and of course objects 6) but act to permit arms 18 to be slidably adjusted along first tubular pipe-like member 14 of frame 10 if the need arises.

A supporting means is provided by cantilever rigidifying supporting structure, or truss or bridge, 31 preferably constructed of tubular pipe-like members, hollow or solid, joined together and to first tubular pipe-like member 14 of frame 10 by any of the known methods such as welding to form a rigid cantilever supporting structure or truss 31, extending generally vertically upward from first tubular pipe-like member 14 of frame 10 to provide a support means for strengthening first tubular pipe-like member 14 of frame 10 from downwardly deforming forces which may develop due to the weight of objects 6 being carried by axle 24 and arms 18.

Figure 4:
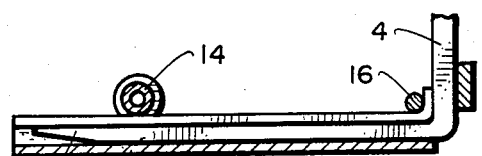
FIG. 4 is a partial cut-away cross-sectional view taken along the line 4—4 of FIG. 3.
Figure 5:
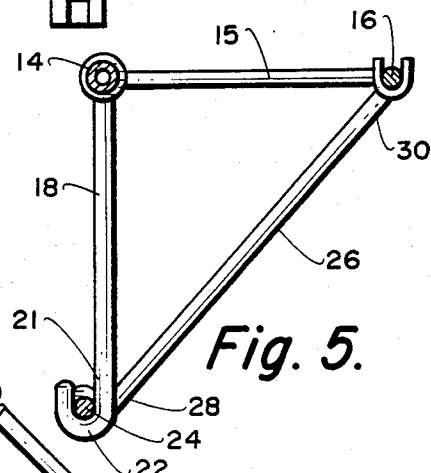
FIG. 5 is a side elevational view taken along the line 5—5 of FIG. 3.

Two hollow, generally rectangular channel members 32 are transversely attached to first tubular pipe-like member 14 and second tubular pipe-like member 16 of frame 10 in a selectively slidably movable manner so that channel members 32 may be slidably positioned along an axis generally parallel to the longitudinal axes of first tubular pipe-like member 14 and second tubular pipe-like member 16 of frame 10. Channel members 32 are adapted to adjustably receive and retain therein, in a releasable manner, lift forks 4 of fork-lift truck 2. Accordingly, in use, as best seen in FIGS. 1 and 4, lift forks 4 of fork-lift truck 2 may be received and retained in channel members 32 so that when lift forks 4 are vertically moved, apparatus 1 is lifted, including objects 6 being carried by apparatus 1. In this raised state, apparatus 1 and objects 6 may be carried to, or positioned at, a job site by fork-lift truck 2.

Similarly, as best seen in FIG. 6, eyelets 34 attached by welding or the like to apparatus 1, preferably to cantilever rigidifying supporting structure 31, may be engaged by holding couplings 36 of an overhead hoist (not illustrated) so that apparatus 1 and carried objects 6 may be lifted to positions not accessible to smaller power moving equipment. As a non-limiting example, apparatus 1 could be used in association with an overhead hoist crane as is commonly found in warehouses or at construction sites to position various sized cable reels at floors above ground level or other such locations generally inaccessible to reel carriers mounted on fork-lift type vehicles, thereby speeding up work, easing danger of handling heavy, bulky and generally unwieldy cable reels and generally allowing workers simultaneous access to various cable reels as the job requires.

The present invention described here in a preferred embodiment can engage and carry mounted on it a multiple number of objects 6 (the Figures, especially FIGS. 2 and 6, clearly show three and four reel-like objects 6, respectively). This permits cable or the like to be pulled from each of these mounted objects 6 simultaneously, thus speeding up the pulling process and accordingly saving not only time, but money. Even if cable or the like is pulled from objects 6 one at a time, time is still saved by eliminating the necessity of removing the unwanted mounted object 6 from apparatus 1, mounting the desired new object 6 and repositioning the apparatus and newly mounted object 6 for use.

Figure 7:
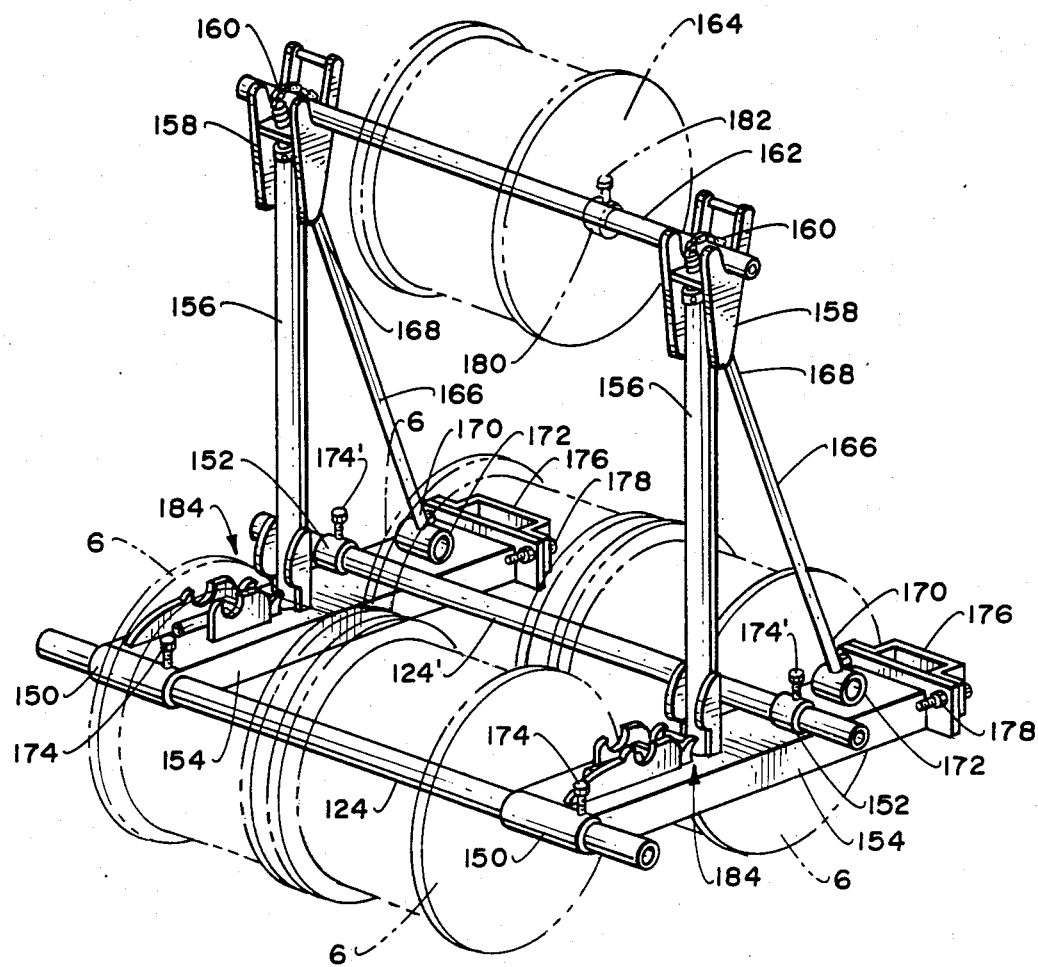
FIG. 7 is a perspective view of a multiple reel carrier attachment for supporting several cable reels in tandem, capable of transporting the cable reels over rough terrain.
Figure 11:
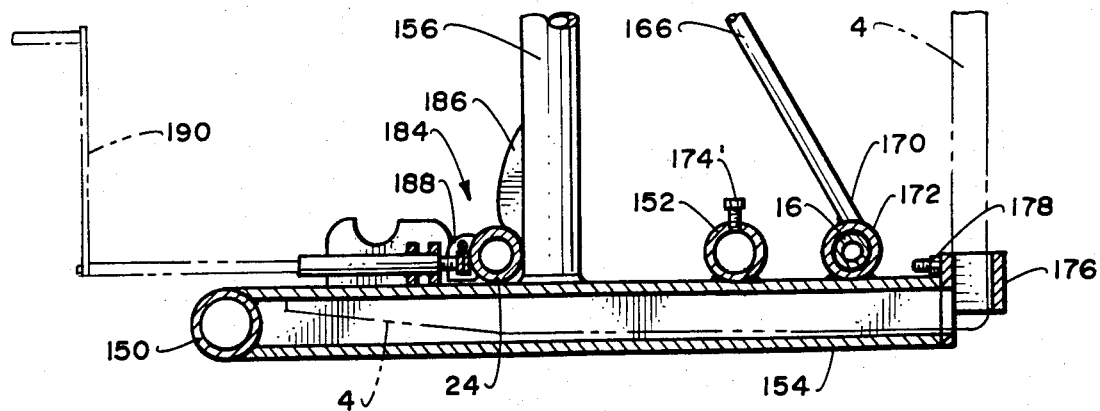
FIG. 11 is a cross-sectional view taken along the line 11—11 of FIG. 10, depicting the mechanism for securely clamping a tubular member of the frame shown in FIGS. 9 and 10.
Figure 8:
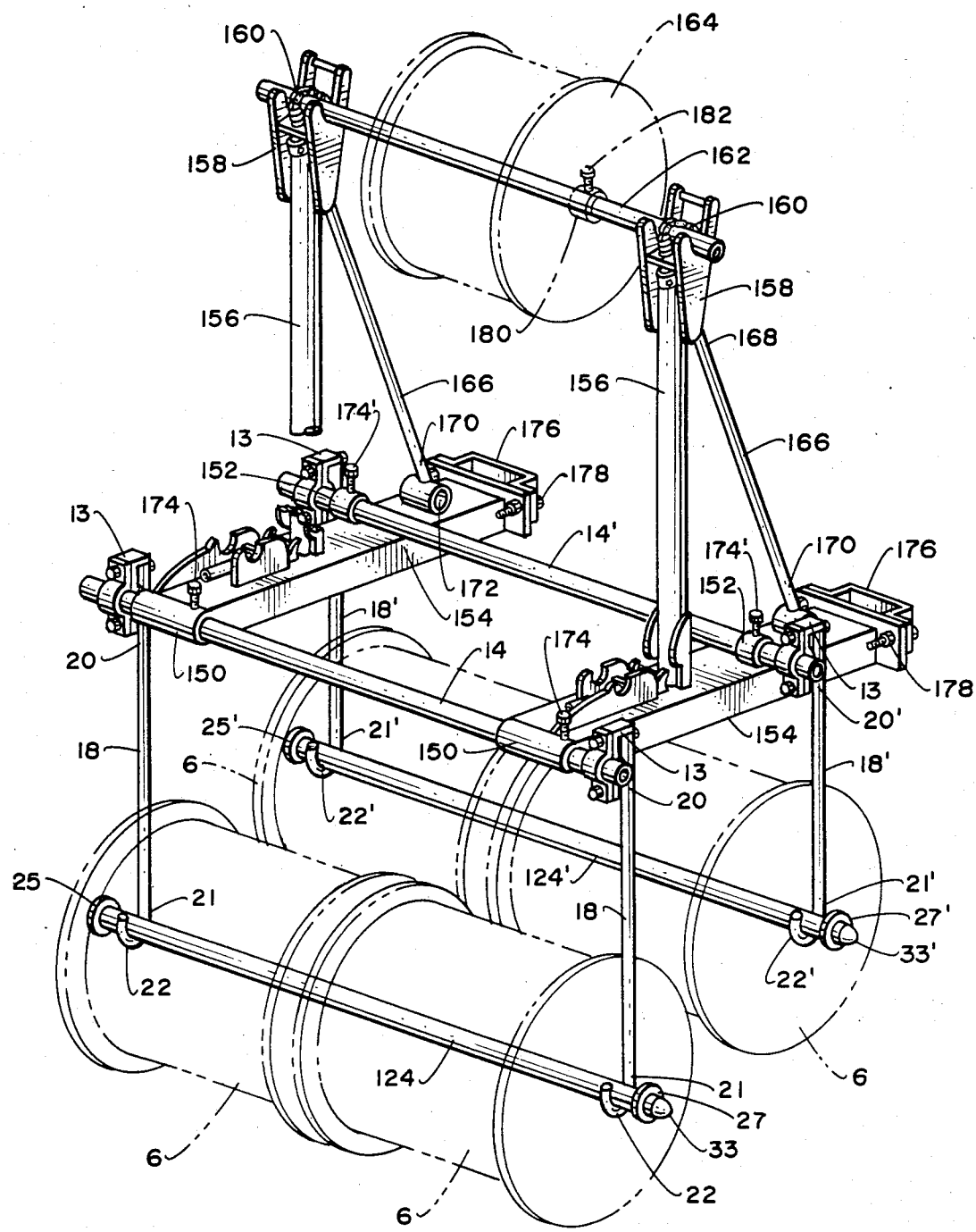
FIG. 8 is a perspective view of an alternative embodiment to that of FIG. 7, showing the cable reels suspended below the fork lifts.

There may be instances in which it is not convenient to employ the linear, or side-by side, carrying apparatus depicted in FIGS. 2 and 4. For example, space considerations may dictate a tighter fitting arrangement. FIGS. 7 and 8 depict alternative embodiments of a tandem arrangement. In FIGS. 7 and 8, reel-like objects 6 are supported on axles 124, 124'. In FIG. 7, the forward axle 124 is rotatable mounted in forward brackets 150, while rear axle 124' is mounted in rear brackets 152. The axles 124, 124' are secured in position by locking screws 174, 174', respectively.

A means 154 for receiving the lift forks is provided, one for each lift fork. The means 154 is of rectangular cross-section, comprising a material adequate for supporting the weight of the assembly and reels. In configuration, the two lift fork receiving means 154 are very similar to the two hollow, generally rectangular channel members 32 described in connection with FIGS. 1-6.

Extending upwardly from the lift fork receiving means 154 is a vertical support means 156. A clamp 158 is provided at the top of the vertical support means 156. In a preferred embodiment, the clamp 158 is of the type provided with a chain 160 which may be tightened to secure a tubular member 162. While the vertical support member 156 has a number of uses in the invention, in the embodiment depicted in FIGS. 7 and 8, it is shown supporting a tubular member 162 on which is rotatably mounted a reel-like member 164. Reel-like member 164 conveniently supports a ground cable, which may be combined with cables emanating from any of the reels 6.

Bracing members 166 are connected at a first end 168 to the vertical support means 156 and at an opposite second end 170 to the lift fork receiving means 154. A hollow tubular member 172 may conveniently be used. Connection of the bracing member 166 at either end is conveniently made by welding.

The lift fork receiving means 154 is provided with a U-shaped bracket 176 which is used to clamp the lift forks 4 in place after insertion into the lift fork receiving means 154, employing bolts 178.

The reel-like member 164 is prevented from moving laterally by a pair of clamps 180 (one of which is visible), tightened by locking screw 182.

The reels 6 may be carried in a tandem manner suspended over the terrain, as depicted in FIG. 7. In this position, the lift fork truck is able to readily tranverse rough terrain, without fear of the reels 6 coming in contact with the ground. By rough terrain is meant any terrain other than level terrain, and includes curbs, gullies and other changes in the terrain often found at a construction site.

In FIG. 8, where rough terrain is not a problem but lateral space is, the reels 6 may again be mounted in tandem position but suspended below the lift fork receiving means 154. The apparatus for suspending the reels 6 may employ downwardly depending forward arms 18 and downwardly depending rear arms 18', attached at an upper end 20, 20' to a tubular pipe-like member 14, 14'. A preferred means for attaching arms 18, 18' to the tubular pipe-like members 14, 14' is a two-piece Dutchman-type clamp 13 which enables selective positioning of arms 18 along a longitudinal axis of the tubular-pipe member 14.

An opposite lower end 21, 21' of arms 18, 18' have a U-shaped, hook-like portion 22, 22' adapted to receive and retain therein, in a selectively releasable relation, axle 124, 124' in a generally parallel spaced relation to the tubular pipe-like member 14, 14'.

Although not shown in FIGS. 7 and 8, the buffer plate 18 may optionally be employed to prevent the individual objects 6 from rubbing against arms 18 or against each other.

As described above in connection with FIGS. 1-6, axles 124, 124' have a diameter adapted to pass through a center opening in the objects 6 and can be retained in U-shaped, hook-like portions 22, 22' of arms 18, 18' and have a length sufficient to extend beyond the dimensions of the objects 6. The axles 124, 124' conveniently have the same features as axle 24 described above.

Figure 9:
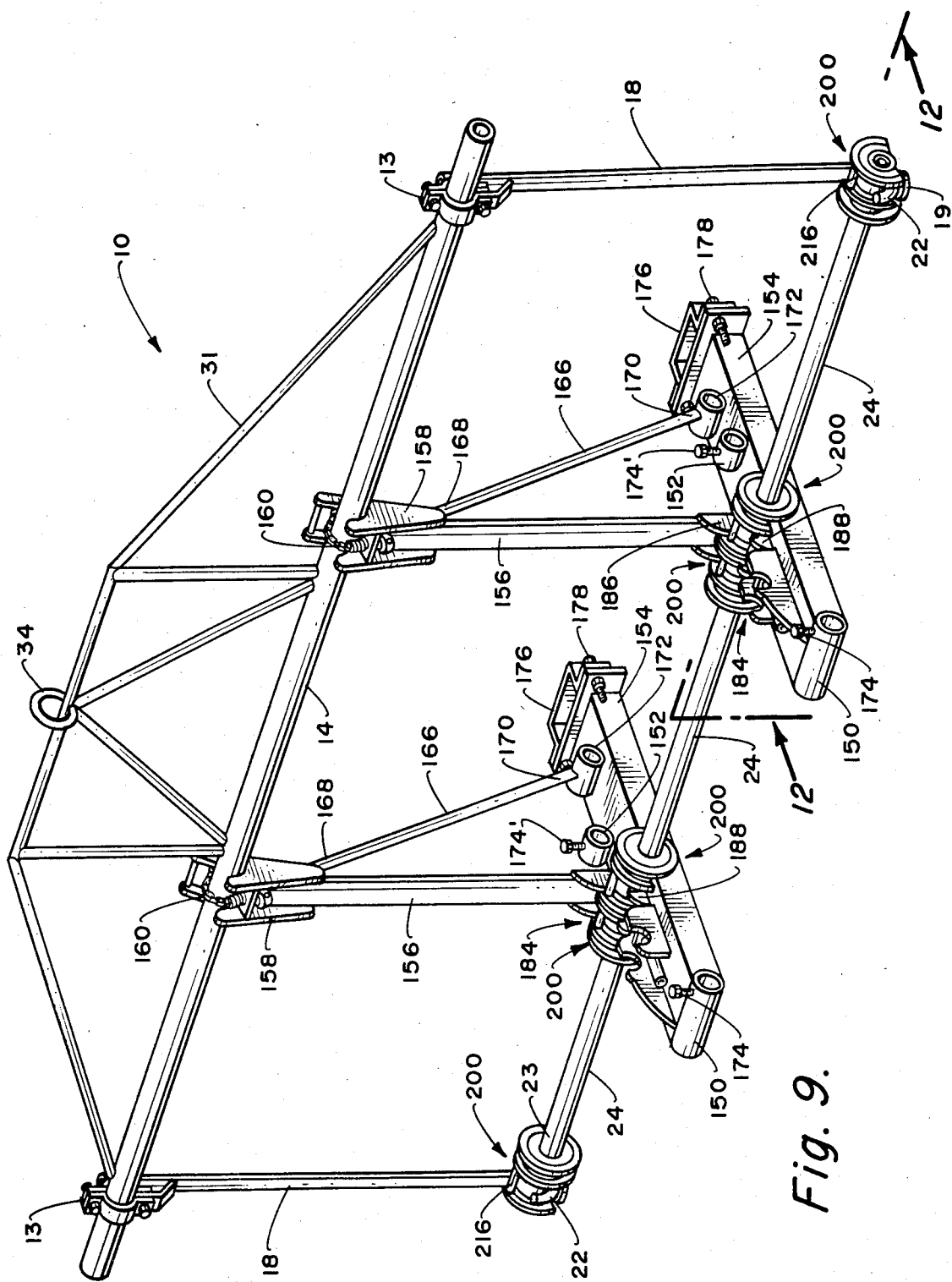
FIG. 9 is a perspective view of an embodiment similar to that depicted in FIGS. 1-6, showing an alternative support means for transport of the cable reels over rough terrain.
Figure 10:
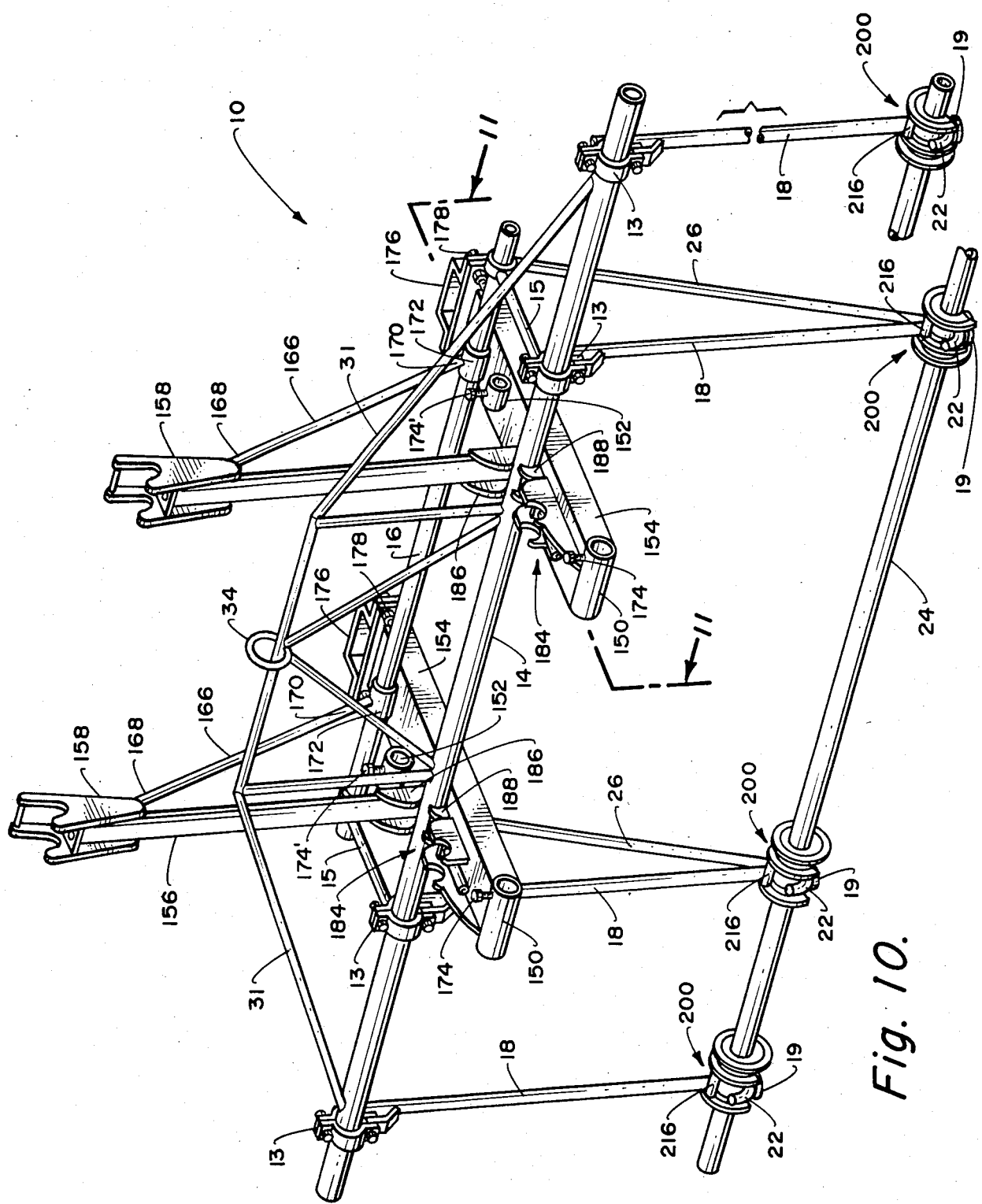
FIG. 10 is a perspective view of apparatus similar to that of FIG. 9, but showing the supporting frame in a lowered position.

FIGS. 9-10 depict how the basic supporting apparatus may be used with the platform frame 10 described above in connection with FIGS. 1-6. In FIG. 9, the frame 10 has all of the components shown earlier, with the exception of the second tubular-like member 16, transverse tubular-like members 15 and bracing members 26. These elements, however, are used in FIG. 10, as will be described below.

In FIG. 9, the platform frame 10 is shown elevated in the upper position, with the tubular pipe-like member 14 supported in the clamps 158. The lower tubular pipe-like member 24 is clamped in a pipe clamp 184, which comprises a stationary pipe support 186 and a movable clamping means 188. As shown more clearly in FIG. 11, the movable clamp 188 is moved in or out of clamping relation to the tubular support pipe-like member 24 by means of a crank 190 (shown in phantom).

The platform frame 10 may alternatively be carried in a lowered position, as shown in FIG. 10. As depicted therein, the entire structure is repositioned such that tubular pipe-like member 14 replaces tubular pipe-like member 24 in the clamps 184. At that time, for additional support, the second tubular pipe-like member 16, transverse tubular pipe-like members 15 and bracing members 26, described above, may be added. As shown in FIG. 10, the second tubular pipe-like member 16 is held in a generally parallel, spaced relation by transverse tubular pipe-like members 15, and passes through tubular members 172.

The preferred embodiments depicted in FIGS. 8-11 can not only engage and carry mounted thereon a number of objects 6, but also permit carrying these objects at an elevation above the ground to avoid the problems that might otherwise be encountered in uneven terrain. As with the embodiments disclosed in FIGS. 1-6, the invention permits cable or the like to be pulled from each of the mounted objects 6 simultaneously, thus speeding up the pulling process and accordingly saving not only time but money.

A preferred flanged retainer 200, shown in detail in FIGS. 12-14, comprises a first spool section 202, comprising a pair of flanges 204, 206 and a shaft 208 provided with interior threads 210, and a second spool section 211, adjacent said first spool section 202 and coaxial therewith. The second spool section 211 comprises flange 206 (of the first spool section), flange 212 and shaft 214, colinear with shaft 210. The interior of the shaft 214 is unthreaded. The first spool section 202 includes a transverse pin 216, which prevents complete rotation when the clamp 200 is employed in conjunction with a downwardly depending pipe-like member, such as member 18 in FIG. 9. The flanges 204, 206 of the first spool section 202 are also truncated along a chord line just below the outside of the shaft 208 of the spool and tangent thereto; this truncation prevents complete rotation of the retainer 200 when it is employed in conjunction with a flat surface support, such as fork lift receiving means 154, as depicted in FIG. 9.

Use of the flanged retainer 200 permits utilization of several short lengths of pipe-like members 24a, 24b, etc., rather than one long pipe-like member 24, as shown in FIG. 12. Accordingly, assembling several reels 6 is made easier using the combination of double spool clamp 200 with several pipe-like members 24. In addition, flange 212 prevents reel 6 from rubbing against any of the support members or surfaces, such as hook-like portion 22 and fork lift receiving means 32 or 154.

The flanged retainer 200 may be used in conjunction with any of the assemblies depicted herein.

The invention described above is, of course, susceptible to many variations, modifications and changes, all of which are within the skill of the art. It should be understood that all such variations, modifications and changes are within the spirit and scope of the invention and of the appended claims. Similarly, it will be understood that it is intended to cover all changes, modifications and variations of the example of the invention herein disclosed for the purpose of illustration which do not constitute departures from the spirit and scope of the invention.

What is claimed is:

1. An apparatus adapted for use with power equipment such as a fork-lift truck having a pair of forwardly extending, vertically movable lift forks, which enables such truck to handle at least one relatively large, horizontally disposed cylindrical object having a central axially oriented opening therethrough, said apparatus comprising:
    a horizontal main support member;
    at least two downwardly depending arms attached at an upper end to said horizontal main support member and having means on an opposite lower end of the said arms to retain in a selectively releasable relation an axle member in a generally parallel spaced relation to said horizontal main support member;
    rigidifying supporting means attached to said horizontal main support member and extending generally vertically upward therefrom, adapted to support said horizontal main support member from deforming forces; and
    means for mounting and supporting said horizontal main support member in a generally horizontal and selectively releasable relation to said lift fork of said truck, comprising (a) means for receiving said lift forks, (b) vertical support means extending upwardly from said lift fork receiving means and (c) bracing members connected at a first end to said vertical support means and at an opposite second end to said means for receiving said lift forks.

2. A flanged retainer for engaging and supporting an axle, the ends of which are threaded, said flanged retainer comprising:
    (a) a hollow shaft for receiving a portion of a threaded axle;
    (b) a flange mounted on each end of said shaft, one flange defining an outer portion of said retainer and the second flange defining an inner portion;
    (c) a third flange mounted on said shaft intermediate said inner and outer flanges;
    (d) means within said hollow shaft for threadably engaging said threaded axle, said means for threadably engaging positioned between said outer and said intermediate flanges, with the remainder of said hollow shaft adapted to receive a portion of said axle; and
    (e) means for preventing further rotation of said flanged retainer about said axle, said means comprising a pin adjoining said outer and intermediate flanges.

3. The flanged retainer of claim 2 in which said rotation prevention means comprises truncated outer and intermediate flanges, truncated along a tangent to the outside diameter of said shaft.

4. An apparatus adapted for use with power equipment such as a fork-lift truck having a pair of forwardly extending, vertically movable lift forks, which enables such truck to handle at least one relatively large, horizontally disposed cylindrical object having a central axially oriented opening therethrough, said apparatus comprising:
- means for receiving said lift forks;
- vertical support means extending upwardly from said lift fork receiving means, adapted to support a horizontal tubular member associated with reel support means;
- first bracing members connected at a first end to said vertical support means and at an opposite second end to said lift fork receiving means;
- reel support means associated with said lift fork receiving means in a selectively releasable relation for maintaining at least one of said cylindrical objects in a rotatable position; and
- means at the base of said vertical support means for holding a horizontal support member in selectively releasable relation.

5. The apparatus of claim 4 further including first brackets mounted on the forward portion of said lift fork receiving means for slidably engaging a horizontal support member, second brackets mounted on the upper surface of said lift fork receiving means intermediate said vertical support means and said first bracing members for slidably engaging a horizontal support member and third brackets mounted at the base of said first bracing means for slidably engaging a horizontal support member.

6. The apparatus in accordance with claim 5 including first means for suspending said reels below said lift fork receiving means from said first brackets and second means adequately spaced behind said first means, for suspending additional said reels below said lift fork receiving means from said second brackets.

7. The apparatus of claim 6 comprising downwardly depending forward arms and downwardly depending rear arms, attached at an upper end thereof to a tubular pipe-like member and provided at a lower end thereof with a U-shaped, hook-like member adapted to receive and retain therein, in a selectively releasable relation, an axle in a generally parallel spaced relation to said tubular pipe-like member, with a first axle so supported in a forward position, and a second axle so supported in a rear position.

8. The apparatus of claim 4 including a plurality of flanged retainers for retaining a plurality of reel support means, said flanged retainers comprising:
(a) a hollow shaft for receiving a portion of a partially threaded reel support means;
(b) a flange mounted on each end of said shaft, one flange defining an outer portion of said retainer and the second flange defining an inner portion thereof;
(c) a third flange mounted on said shaft intermediate said inner and said outer flanges;
(d) means within said hollow shaft for threadably engaging said threaded portion of said reel support means, said means for threadably engaging positioned between said outer and said intermediate flanges, with the remainder of said hollow shaft adapted to receive a portion of said reel support means; and
(e) means for preventing further rotation of said flanged retainer about said reel support means, said means comprising a pin adjoining said outer and intermediate flanges.

9. An apparatus adapted for use with power equipment such as a fork-lift truck having a pair of forwardly extending, vertically movable lift forks, which enables such truck to handle at least one relatively large, horizontally disposed cylindrical object having a central axially oriented opening therethrough, said apparatus comprising:
- means for receiving said lift forks;
- vertical support means extending upwardly from said lift fork receiving means, adapted to support a horizontal tubular member associated with reel support means;
- first bracing members connected at a first end to said vertical support means and at an opposite second end to said lift fork receiving means; and
- reel support means associated with said lift fork receiving means in a selectively releasable relation for maintaining at least one of said cylindrical objects in a rotatable position, said reel support means comprising
  - at least two downwardly depending arms attached at an upper end to a first horizontal tubular member of said frame and having means on an opposite lower end of said arms to retain in a selectively releasable relation an axle member in a generally parallel spaced relation to said horizontal tubular member of said frame, said axle member adapted to pass through said opening in said cylindrical object and extend beyond the dimensions thereof, and
  - truss supporting means attached to said first horizontal tubular member of said frame and extending generally vertically upward therefrom and adapted to support said horizontal tubular member of said frame from deforming forces.

10. The apparatus of claim 9 in which said first horizontal tubular member of said frame is supported by said vertical support means and said axle member is supported by support means provided at the base of said vertical support means.

11. The apparatus of claim 9 in which said first horizontal tubular member of said frame is supported by support means provided at the base of said vertical support means and said frame is further provided with second bracing members connected at a first end to at least one of said downwardly depending arms and at an opposite second end to a second horizontal tubular member, held in a generally parallel, spaced relation from said first horizontal tubular member of said frame and supported by said third brackets at the base of said first bracing members.

12. The apparatus of claim 9 including a plurality of flanged retainers for retaining a plurality of reel support means, said flanged retainers comprising:
(a) a hollow shaft for receiving a portion of a partially threaded reel support means;
(b) a flange mounted on each end of said shaft, one flange defining an outer portion of said retainer and the second flange defining an inner portion thereof;
(c) a third flange mounted on said shaft intermediate said inner and said outer flanges;
(d) means within said hollow shaft for threadably engaging said threaded portion of said reel support means, said means for threadably engaging positioned between said outer and said intermediate flanges, with the remainder of said hollow shaft adapted to receive a portion of said reel support means; and (e) means for preventing further rotation of said flanged retainer about said reel support means, said means comprising a pin adjoining said outer and intermediate flanges.

* * * * *